United States Patent
Affaki

(10) Patent No.: US 7,483,961 B2
(45) Date of Patent: Jan. 27, 2009

(54) METHOD AND APPARATUS FOR CONTROLLING EXECUTION OF AN APPLICATION

(75) Inventor: John Y. Affaki, San Jose, CA (US)

(73) Assignee: Microsoft Corporation, Redmond, WA (US)

( * ) Notice: Subject to any disclaimer, the term of this patent is extended or adjusted under 35 U.S.C. 154(b) by 802 days.

(21) Appl. No.: 10/995,641

(22) Filed: Nov. 23, 2004

(65) Prior Publication Data

US 2006/0112181 A1 May 25, 2006

(51) Int. Cl.
*G06F 15/16* (2006.01)

(52) U.S. Cl. .............. 709/219; 709/203; 709/224; 709/242; 715/744; 715/745

(58) Field of Classification Search ........... 709/203, 709/219, 224, 242; 715/744, 745
See application file for complete search history.

(56) References Cited

U.S. PATENT DOCUMENTS

| | | | |
|---|---|---|---|
| 6,362,836 B1 * | 3/2002 | Shaw et al. | 715/744 |
| 6,687,745 B1 * | 2/2004 | Franco et al. | 709/219 |
| 2002/0046262 A1 * | 4/2002 | Heilig et al. | 709/219 |
| 2002/0087630 A1 * | 7/2002 | Wu | 709/203 |
| 2006/0075088 A1 * | 4/2006 | Guo et al. | 709/224 |
| 2007/0266176 A1 * | 11/2007 | Wu | 709/242 |

* cited by examiner

*Primary Examiner*—Jinsong Hu
(74) *Attorney, Agent, or Firm*—Lee & Hayes, PLLC

(57) ABSTRACT

A terminal server receives a request from a client to execute an application program on the terminal server. The terminal server identifies information associated with the application program and determines whether the client is permitted to access the application program based on the information associated with the application program. If the client is permitted to access the application program, the application program is launched within an application launcher on the terminal server, which sends data to be rendered to the client and instructs the client to begin rendering the data after successfully launching the application program.

34 Claims, 5 Drawing Sheets

METHOD AND APPARATUS FOR CONTROLLING EXECUTION OF AN APPLICATION

TECHNICAL FIELD

The systems and methods described herein relate to controlling the execution of an application program.

BACKGROUND

Various devices execute application programs at the request of a user or system. These application programs may interact with other application programs and with other devices. Certain application programs may be executed on remote systems and interact with remote applications via a network, such as the Internet. These remote activities may allow a user to access unauthorized information, for example, by hacking into a remote system or circumventing parental control settings to gain access to an unauthorized web site. Additionally, these activities may result in execution of a malicious application or code segment, such as a malicious JavaScript code, which may damage the application program or the device executing the application program. Such activities jeopardize the security of the device being used as well as the security of other devices coupled via a common network.

Therefore, it would be desirable to provide an improved manner of controlling execution of an application program on a remote device such that access to the application program is restricted to enhance security.

SUMMARY

The systems and methods described herein relate to maintaining control over the execution of an application program on a remote device. In a particular embodiment, a client sends a request to a terminal server to execute an application program. The terminal server identifies information associated with the application program and determines whether the client is permitted to access the application based on that information. If the client is permitted to access the application program, the terminal server launches the application program within an application launcher, sends data to be rendered to the client, and instructs the client to begin rendering the data.

BRIEF DESCRIPTION OF THE DRAWINGS

Similar reference numbers are used throughout the figures to reference like components and/or features.

DETAILED DESCRIPTION

The systems and methods discussed herein control execution of an application program on a remote device to restrict unauthorized access to information or applications, and to restrict unauthorized activities by the application program. This is accomplished by using a smart application launcher that controls execution of an application program by restricting the application program's activities and restricting the application program's access to information and other resources. For example, a client may request execution of a web browser application by a server. The server uses a smart launcher application that embeds a web browser control, which allows the smart launcher application to control execution of the web browser application. The server is configured such that the client can only access the smart launcher application—other application programs are not accessible by the client. The smart launcher application also determines which application programs can be executed by the client based on user permissions and the like. Thus, the smart launcher application oversees execution of other application programs requested by the client.

As used herein, the term "client" refers to an application that is executed on a "client device". A client device may be a television (or other display device), a set top box, a game console, a personal computer, a workstation, or any other device capable of executing an application program. The term "server" refers to any device capable of managing one or more resources coupled to a network. For example, a server may be a computing system that manages multiple client devices coupled to a common network. A "terminal server" refers to a device running a terminal server application program.

Particular examples discussed herein relate to television-based clients (and client devices) coupled to a network, such as the Internet. However, the systems and methods discussed herein are applicable to the control of any application program operating on any type of client device in any type of operating environment. Further, the systems and methods discussed herein are applicable to any network environment and are not limited to the Internet.

Figure 1:
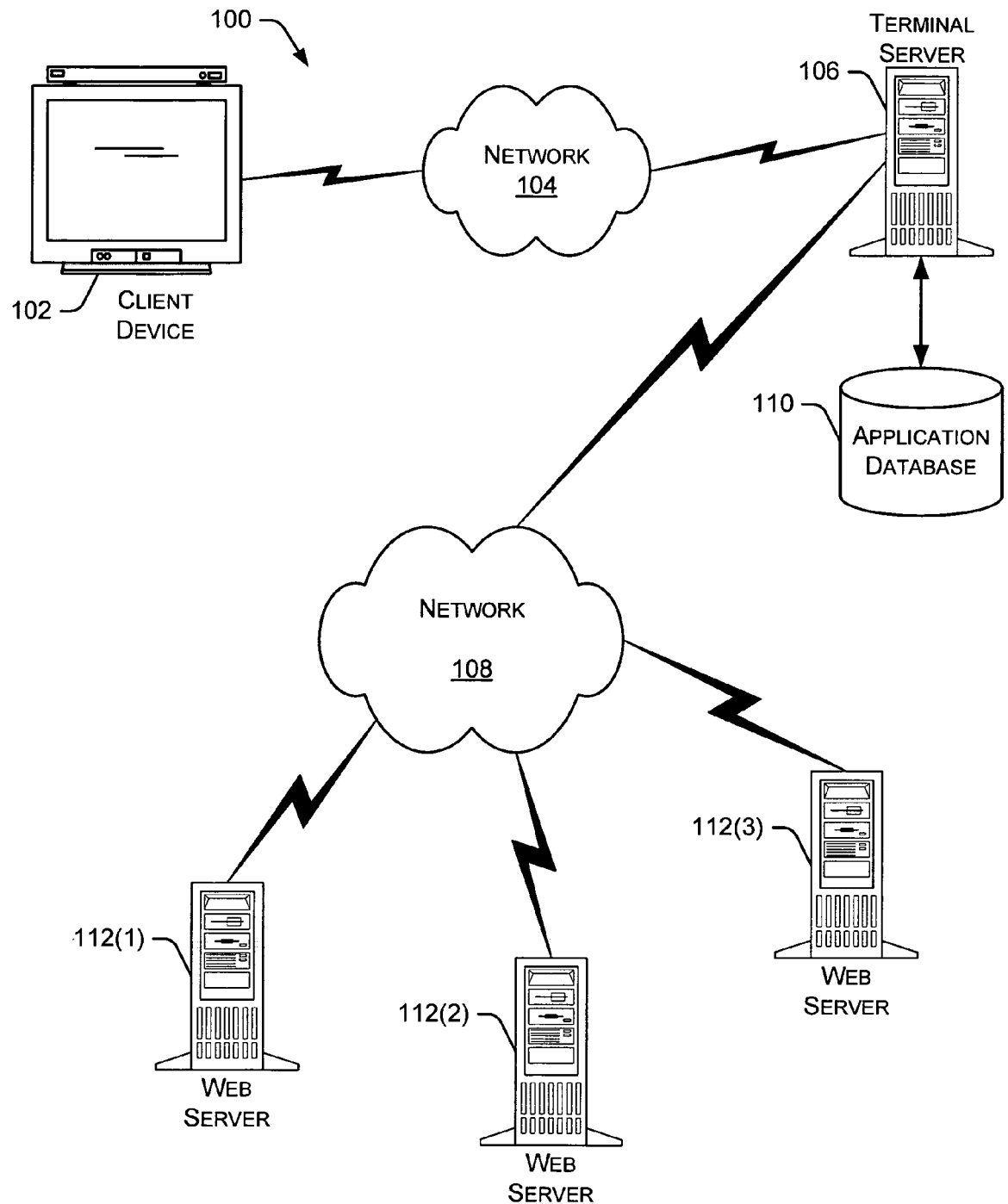
FIG. 1 illustrates an example environment in which the methods and systems described herein may be implemented.

FIG. 1 illustrates an example environment 100 in which the methods and systems described herein may be implemented. A client device 102 is coupled to a network 104, such as the Internet or a media distribution network. In one embodiment, client device 102 is a display device coupled to (or integrated with) a set top box, cable box, satellite receiver, game console, or other device (not shown) that provides video and/or audio data to the display device.

A terminal server 106 is also coupled to network 104. Terminal server 106 executes various application programs, such as the smart launcher application discussed herein, and interacts with client device 102 via network 104. In one embodiment, terminal server 106 communicates with client device 102 using RDP (Remote Desktop Protocol), developed by Microsoft Corporation of Redmond, Wash. Terminal server 106 is also coupled to a network 108, such as the Internet or other data network. Terminal server 106 communicates with various servers and other devices via network 108.

Terminal server 106 is also coupled to application database 110, which contains information regarding the manner in which the terminal server can execute application programs. In a particular embodiment, application database 110 is also accessible by an administrator using another computing system (not shown) coupled to the application database. In one embodiment, terminal server 106 communicates with application database 110 using SQL (Structured Query Language). Although FIG. 1 illustrates one client device 102 and one terminal server 106, a particular environment 100 may include any number of client devices and any number of terminal servers coupled to one another through one or more networks.

Multiple web servers 112 are also coupled to network 108. Web servers 112 provide various web services, web-based application programs, and the like. In one embodiment, web servers 112 communicate with other servers (such as terminal server 106) and systems using http (hypertext transfer protocol). Although FIG. 1 illustrates three web servers 112, a particular environment 100 may include any number of web servers coupled to one anther through one or more networks.

Figure 2:
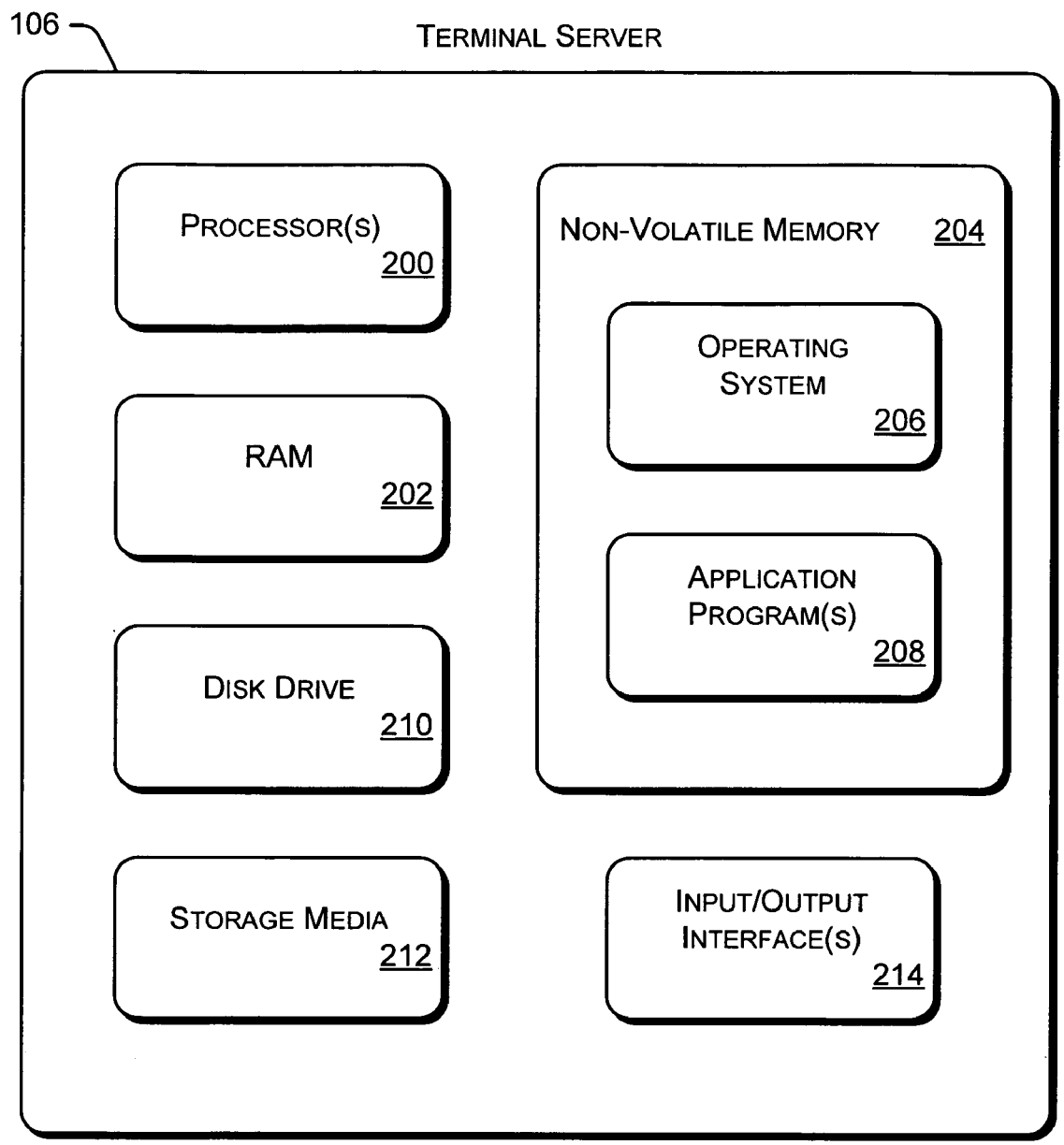
FIG. 2 is a block diagram of selected components of the terminal server shown in FIG. 1.

FIG. 2 is a block diagram of selected components of terminal server 106 shown in FIG. 1. Terminal server 106 includes one or more processors 200, a random access memory (RAM) 202, and a non-volatile memory 204 that contains, for example, an operating system 206 and one or more application programs 208. Terminal server 106 also includes a disk drive 210 and storage media 212. Although not shown in FIG. 2, a system bus typically couples together the various components within terminal server 106.

Processor(s) 200 process various instructions to control the operation of terminal server 106 and to communicate with other electronic and computing devices. The memory components (e.g., RAM 202, disk drive 210, storage media 212, and non-volatile memory 204) store various information and/or data such as configuration data and application data.

Terminal server 106 also includes one or more input/output interfaces 214. Input/output interface(s) 214 receive input from one or more systems, components, peripheral devices, and the like. Additionally, input/output interface(s) 214 send information to one or more systems, components, peripheral devices, and the like. For example, input/output interface(s) 214 allow terminal server 106 to communicate with client device 102, web servers 112, application database 110, and other systems.

Figure 3:
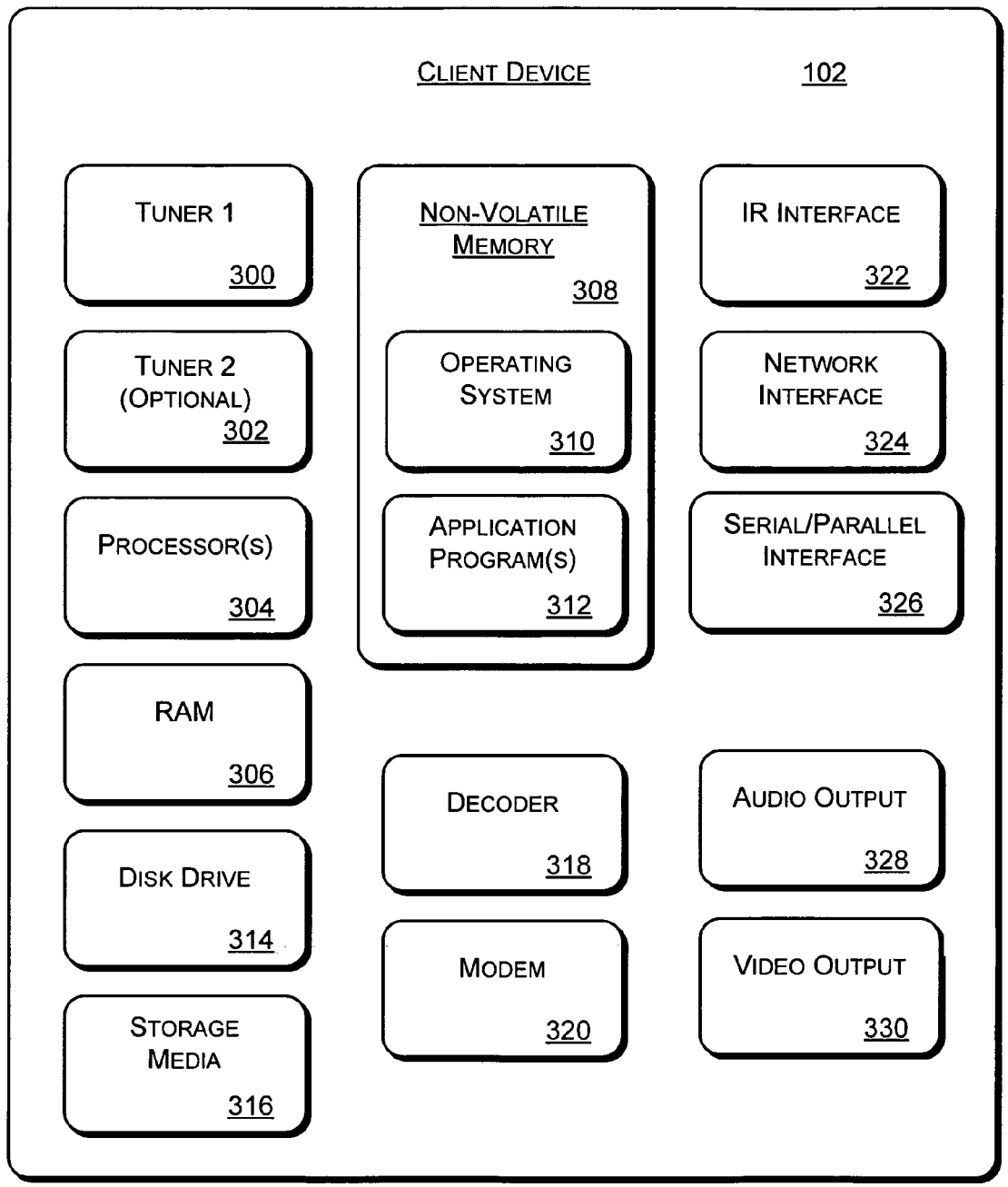
FIG. 3 is a block diagram of selected components of the client device shown in FIG. 1.

FIG. 3 is a block diagram of selected components of client device 102 shown in FIG. 1. Client device 102 includes a first tuner 300 and an optional second tuner 302, one or more processors 304, a random access memory (RAM) 306, and a non-volatile memory 308 that contains, for example, an operating system 310 and one or more application programs 312. Client device 102 also includes a disk drive 314 and storage media 316. Although client device 102 is illustrated having both a RAM 306 and a disk drive 314, a particular client device may include only one of the memory components. Additionally, although not shown, a system bus typically couples together the various components within client device 102.

Processor(s) 304 process various instructions to control the operation of client device 102 and to communicate with other electronic and computing devices. The memory components (e.g., RAM 306, disk drive 314, storage media 316, and non-volatile memory 308) store various information and/or data such as configuration information and graphical user interface information.

Client device 102 also includes a decoder 318, such as an MPEG-2 decoder that decodes MPEG-2-encoded signals. A modem 320 allows client device 102 to communicate with other devices via a conventional telephone line. An IR interface 322 allows client device 102 to receive input commands and other information from a user-operated device, such as a remote control device or an IR keyboard. Client device 102 also includes a network interface 324, a serial/parallel interface 326, an audio output 328, and a video output 330. Interfaces 324 and 326 allow client device 102 to interact with other devices via various communication links. Although not shown, client device 102 may also include other types of data communication interfaces to interact with other devices. Audio output 328 and video output 330 provide signals to a television or other device that processes and/or presents the audio and video data. Although client device 102 is illustrated having multiple interfaces, a particular client device may only include one or two such interfaces.

Client device 102 also includes a user interface (not shown) that allows a user to interact with the client device. The user interface may include indicators and/or a series of buttons, switches, or other selectable controls that are manipulated by a user of the client device.

Figure 4:
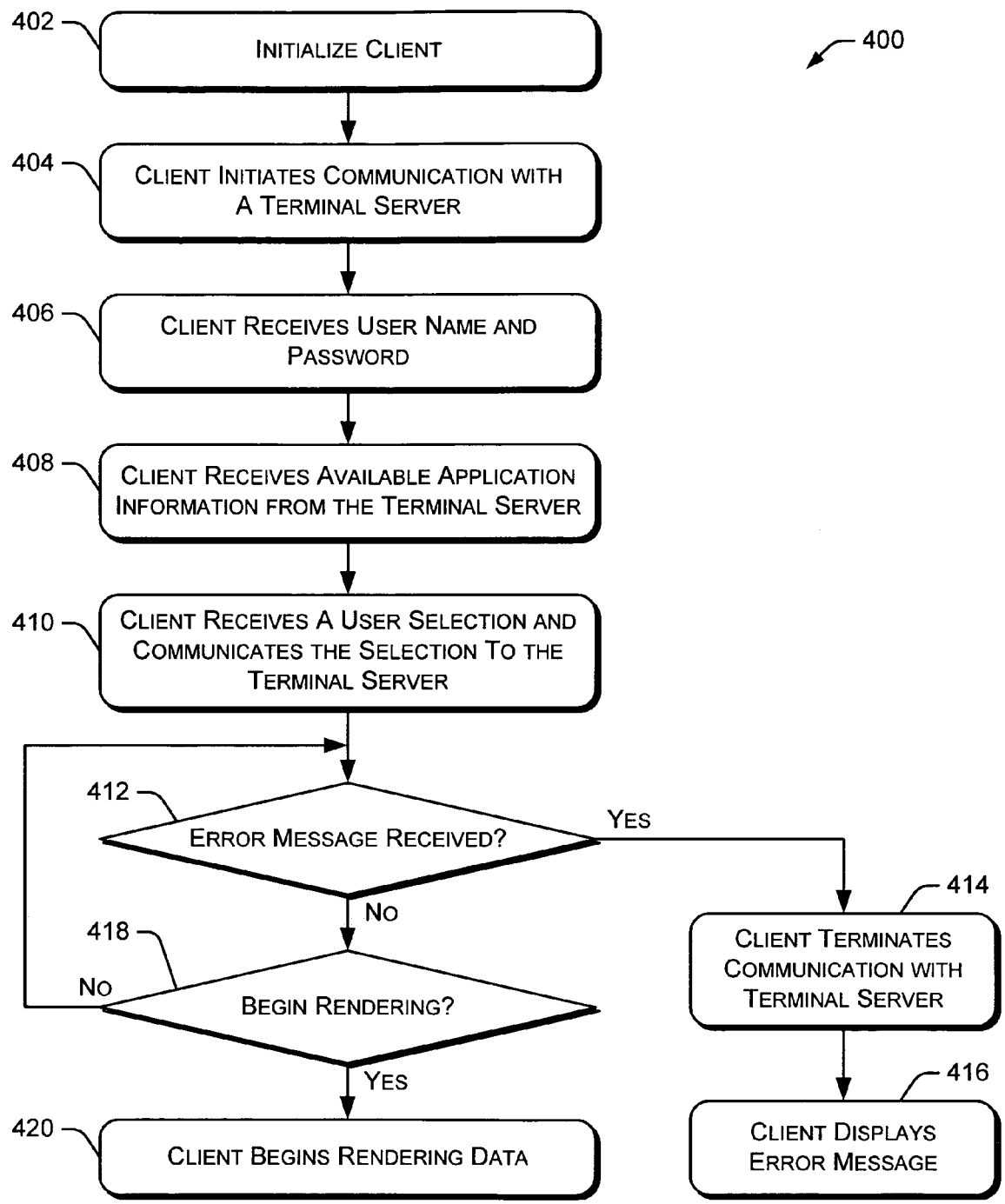
FIG. 4 is a flow diagram illustrating an embodiment of a procedure implemented by a client.

FIG. 4 is a flow diagram illustrating an embodiment of a procedure 400 implemented by a client. The procedure begins when the client is initialized (block 402), e.g., when the client device (such as client device 102) is powered "ON" or reset. The client then initiates communication with a terminal server (block 404), such as terminal server 106. For example, the client sends identification information, client device information, and client information to the terminal server. This information is used by the terminal server to determine which application programs are capable of being handled by the client and which application programs the user is authorized or permitted to access. The client then receives a user name and a password from the terminal server (block 406).

The terminal server performs various procedures (discussed below with respect to FIG. 5) and provides information to the client. This information includes, for example, a listing of available applications (block 408) that can be executed by the terminal server on behalf of the client. As discussed below, the applications available to a particular client vary based on the user of the client, services subscribed to by the client, the capabilities of the client, and the like. Example applications include video-on-demand applications, game applications, web browser applications, and the like.

In one embodiment, the client displays the listing of available applications to the user. The client then receives a selection from the user and communicates that selection to the terminal server (block 410). In alternate embodiments, the client may automatically select a particular application based on user preferences, previously selected applications, and the like.

In another embodiment, the user of the client device is unaware that the application is being executed on a remote device. For example, when a user selects an application or service from a menu, the application may be launched automatically by the client on the terminal server. This process is transparent to the user. Additionally, when a user tunes to a particular channel, the client may automatically launch a particular application on the terminal server.

The client then waits for additional information from the terminal server. While waiting for additional information from the terminal server, the client displays a general "loading" message to the user of the client device, such as "Loading Application, Please Wait". If the client receives an error message (block 412), the client terminates the communication link with the terminal server (block 414) and displays an error message to the user of the client device (block 416).

If the client does not receive an error message, the client determines whether an instruction to begin rendering has been received from the terminal server (block 418). If not, the client continues waiting and continues to display the general "loading" message. During this period of waiting for an error message or an instruction to begin rendering, the client may receive other data from the terminal server. This other data may include data to be rendered on the client device upon receiving appropriate instructions. Thus, although the client is receiving data that could be rendered, the client device continues to display the general "loading" message until instructed to begin rendering the data.

When the client receives an instruction to begin rendering at block 418, the client begins rendering any previously received data as well as any later-received data from the terminal server (block 420). The client continues rendering data received from the terminal server and communicates user input and other data to the terminal server. Rendering of data includes generating a video image for display on a display device and/or generating audio signals for playback through an audio device.

Figure 5:
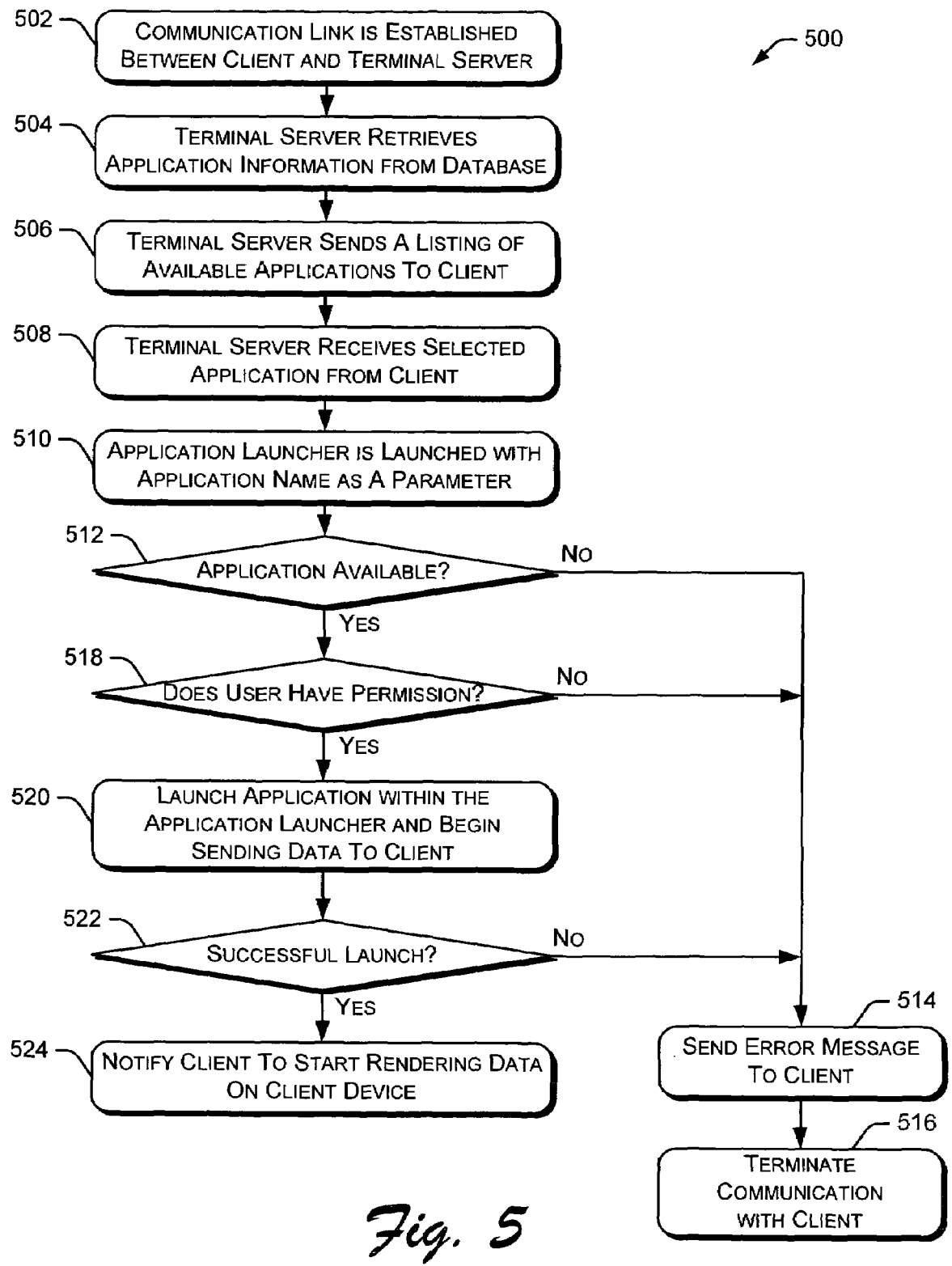
FIG. 5 is a flow diagram illustrating an embodiment of a procedure implemented by a terminal server.

FIG. 5 is a flow diagram illustrating an embodiment of a procedure 500 implemented by a terminal server. Initially, a communication link is established between the client and the terminal server (block 502), e.g., via the Internet or other network. Once the communication link is established, the terminal server communicates with the client to obtain various information, such as user information, client device information, and client information. The terminal server then retrieves application information from the application database (block 504). This application information identifies application programs that are available to the particular client. Particular application programs may not be available to a client if, for example, the client is not capable of handling data from the application or the user is not authorized or permitted to access the application.

An example of information stored in the application database includes information regarding a uniform resource locator (URL) associated with each application, domains that an application (or user) is permitted to access, identification of a web proxy to use with the application, languages supported by the application, devices on which the application is supported, and the resolution at which the application data is displayed. Additionally, the application database may include information regarding how to handle various commands, such as the "back", "forward" and "refresh" commands in a web browser application.

After retrieving application information from the application database, the terminal server sends a listing of available applications to the client (block 506). This list does not include applications that the client is not capable of handling or that the user is not permitted to access. The terminal server then receives a selected application from the client (block 508). As discussed above with respect to FIG. 4, the application selection may be made by a user of the client or automatically selected by the client.

The terminal server then launches an application launcher with the selected application name as a parameter (block 510). The application launcher (also referred to as a smart launcher application) embeds application control, such as web browser control, so that the application launcher can manage applications executed for the client. The application launcher limits a client's application access to the application launcher itself, thereby preventing the client from attempting to access other applications. The terminal server is configured such that applications and other executables, other than the application launcher, cannot be accessed by the client. This configuration prevents the user of the client from accessing applications or other data that the user is not authorized to access, thereby enhancing the security of the terminal server and the network.

Procedure 500 continues as the terminal server determines whether the selected application is available to execute (block 512). If the selected application is not available to execute, the application launcher sends an error message to the client (block 514) and terminates communication with the client (block 516). An application may be unavailable if, for example, a web server that hosts the application is unavailable due to maintenance or a system failure. Additionally, an application may be unavailable if the application has reached its maximum number of allowed connections.

If the selected application is available to execute, the application launcher then determines whether the user has appropriate permission to access the selected application (block 518). If the user does not have permission to access the selected application, the application launcher sends an error message to the client (block 514) and terminates communication with the client (block 516).

If the selected application is available to execute and the user has permission to access the selected application, the application is launched within the application launcher and the terminal server begins sending data to the client (block 520). This data includes information that will be rendered on, for example, a client device on which the client is running. The application launcher then determines whether the application was successfully launched within the application launcher (block 522). If the application did not launch successfully, the application launcher sends an error message to the client (block 514) and terminates communication with the client (block 516). An unsuccessful launch occurs, for example, when an application is not available. Otherwise, the application launcher notifies the client that it can start rendering data on the client device (block 524). The client can begin rendering the data previously received from the application launcher as well as data received after the notice to begin rendering data.

The client is capable of accessing and communicating with the application launcher directly. However, the client does not receive any information regarding how to access other applications or where those applications are located. Instead, the application launcher has access to this information and launches the desired application for the benefit of the client and manages execution of the application for the client.

In one implementation, the application launcher hosts a web browser application and controls execution of the web browser application such that the web browser application is restricted from accessing certain URLs. These restricted URLs are identified in the application database. The restricted URLs may vary from one client to another and from one user to another. Additionally, the application launcher may restrict entire domains or networks for a particular client or user. The application launcher also intercepts various security-related events, such as context menus, pop-ups, file downloads, ActiveX® technologies pop-ups, etc. Further, the application launcher is capable of intercepting web-related events, such as completion of a document, navigation errors, and the like. In a particular embodiment, web server 112 is a web server configured to host one or more RDP web applications.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A method comprising:
   receiving a user name to associate a user with remotely stored application information wherein the application information identifies remote application programs permitted for use by the user and wherein the application information is stored separate from the identified remote application programs;
   establishing a connection with a terminal server wherein the establishing comprises providing the user name;
   requesting, via the terminal server, use of a remote application program;

if, based on the provided user name and remotely stored application information, permission exists for use of the remote application program, receiving, via the terminal server, data to be rendered wherein the data comprises data associated with the remote application program; and delaying rendering of the received data until receipt of rendering instructions from the terminal server.

2. A method as recited in claim 1 further comprising terminating communication with the terminal server if an error message is received from the terminal server.

3. A method as recited in claim 1 further comprising displaying an indication that the application program is loading prior to receiving rendering instructions from the terminal server.

4. A method as recited in claim 1 further comprising:
receiving a password associated with the user name; and
verifying the password.

5. A method as recited in claim 1, wherein the method is performed by a video display device.

6. A method as recited in claim 1, wherein rendering of the data includes generating a video image for display on a display device.

7. A method as recited in claim 1 wherein rendering of the data includes playing audio data through an audio device.

8. One or more computer-readable memories containing a computer program that is executable by a processor to perform the method recited in claim 1.

9. A method comprising:
receiving a request from a client, via a network, to access a remote application program;
identifying information associated with the remote application program, the information stored separate from the remote application program;
determining whether the client is permitted to access the remote application program based on the information associated with the application program;
if the client is permitted to access the remote application program:
    accessing the remote application program;
    launching the remote application program within a local application launcher;
    sending data, via the network, to be rendered to the client; and
    instructing the client, via the network, to begin rendering the data.

10. A method as recited in claim 9 further comprising preventing execution of the application program if the client is not permitted to access the application program.

11. A method as recited in claim 9 wherein the application launcher maintains control of the application program during execution of the application program.

12. A method as recited in claim 9 wherein the information associated with the application program identifies at least one uniform resource locator that can be accessed by the application program.

13. A method as recited in claim 9 further comprising intercepting security-related events identified by the application launcher during execution of the application program.

14. A method as recited in claim 9 further comprising intercepting web-related events identified by the application launcher during execution of the application program.

15. A method as recited in claim 9 further comprising restricting access to at least one network location based on information associated with the application program.

16. A method as recited in claim 9 further comprising generating an error message if launching the application program is unsuccessful.

17. A method as recited in claim 9 further comprising terminating communication with the client if launching the application program is unsuccessful.

18. A method as recited in claim 9 further comprising instructing the client to display an indication that the application program is loading prior to instructing the client to begin rendering the data.

19. A method as recited in claim 9 wherein instructing the client to begin rendering occurs after the application program is successfully launched by the application launcher.

20. One or more computer-readable memories containing a computer program that is executable by a processor to perform the method recited in claim 9.

21. One or more computer-readable storage media having stored thereon a computer program that, when executed by one or more processors, causes the one or more processors to:
establish communication with a client via a network;
identify remote application programs available to the client via the network;
receive, via the network, a selection for a remote application program from the client;
identify information associated with the selected remote application program, the information stored separate from the remote application;
determine whether the client is permitted to access the selected remote application program based on the information associated with the selected remote application program;
if the client is permitted to access the selected remote application program:
    access the selected remote application program;
    launch the selected remote application program within a local application launcher;
    send data, via the network, to be rendered to the client; and
    instruct the client, via the network, to begin rendering the data.

22. One or more computer-readable storage media as recited in claim 21 wherein the one or more processors further prevent execution of the selected application program if the client is not permitted to access the selected application program.

23. One or more computer-readable storage media as recited in claim 21 wherein the information associated with the selected application program identifies a web proxy to use with the selected application program.

24. One or more computer-readable storage media as recited in claim 21 wherein the one or more processors further intercept security-related events generated during execution of the selected application program.

25. One or more computer-readable storage media as recited in claim 21 wherein the one or more processors further intercept web-related events generated during execution of the selected application program.

26. One or more computer-readable storage media as recited in claim 21 wherein the application launcher maintains control of the selected application program during execution of the selected application program.

27. One or more computer-readable storage media as recited in claim 21 wherein the one or more processors further generate an error message if launch of the selected application program is unsuccessful.

28. One or more computer-readable storage media as recited in claim 21 wherein the one or more processors further terminate communication with the client if launch of the selected application program is unsuccessful.

29. One or more computer-readable storage media as recited in claim 21 wherein the one or more processors further instruct the client to display an indication that the selected application program is loading prior to instructing the client to begin rendering the data.

30. One or more computer-readable storage media as recited in claim 21 wherein the one or more processors instruct the client to begin rendering the data after the selected application program is successfully launched.

31. A system comprising:
a memory device; and
a processor coupled to the memory device, wherein the processor is configured to:
receive a request, via a network, from a client to execute a remote application program;
identify information associated with the application program, the information stored separate from the remote application program;
determine whether the client is permitted to access the remote application program based on the information associated with the remote application program;
if the client is permitted to access the application program:
access the remote application program;
launch the remote application program within an local application launcher, wherein the local application launcher maintains control of the remote application program during execution of the remote application program;
send data, via the network, to be rendered to the client; and
instruct the client, via the network, to begin rendering the data after the remote application program is successfully launched by the application launcher.

32. A system as recited in claim 31 wherein the processor is further configured to instruct the client to display an indication that the application program is loading prior to instructing the client to begin rendering the data.

33. A system as recited in claim 31 wherein the processor is further configured to prevent execution of the application program if the client is not permitted to access the application program.

34. A system as recited in claim 31 wherein if the launch of the application program is unsuccessful, the processor is further configured to:
generate an error message; and
terminate communication with the client.

* * * * *